J. C. GREEN.
Turbine Water Wheels.

No. 137,836. Patented April 15, 1873.

2 Sheets--Sheet 1.

Witnesses:

Inventor:
J. C. Green
PER
Attorneys.

J. C. GREEN.
Turbine Water Wheels.

No. 137,836. Patented April 15, 1873.

Witnesses:

Inventor:
J. C. Green
per
Attorneys.

UNITED STATES PATENT OFFICE.

JOHN C. GREEN, OF FLANDERS, NEW JERSEY.

IMPROVEMENT IN TURBINE WATER-WHEELS.

Specification forming part of Letters Patent No. 137,836, dated April 15, 1873; application filed December 21, 1872.

*To all whom it may concern:*

Be it known that I, JOHN C. GREEN, of Flanders, in the county of Morris and State of New Jersey, have invented a new and Improved Water-Wheel, of which the following is a specification:

The invention consists in the improvement of water-wheels, as hereinafter described and pointed out in the claim.

Figure 1:
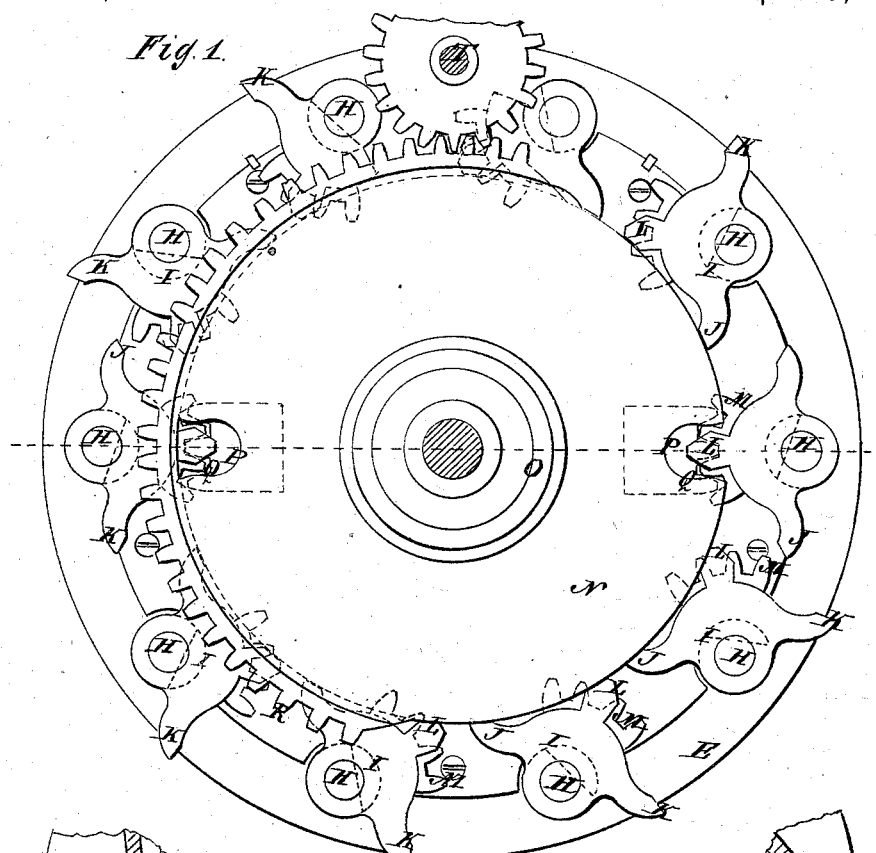
Figure 2:
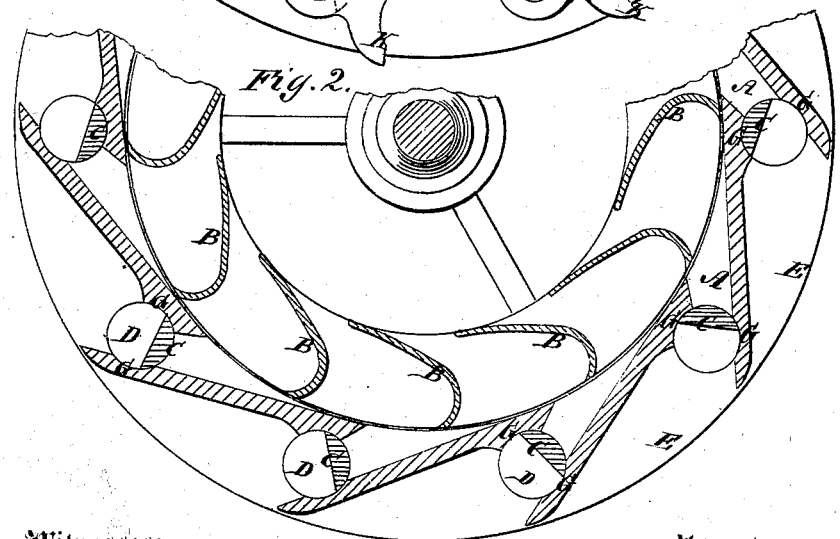
Figure 3:
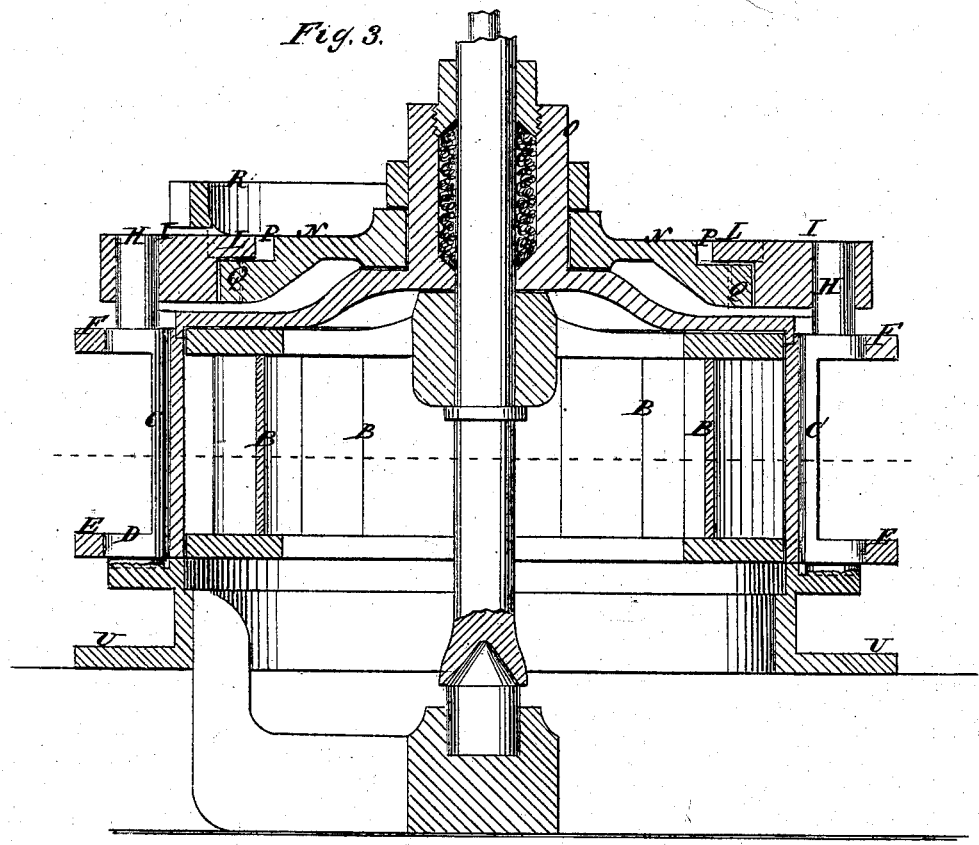
Figure 4:
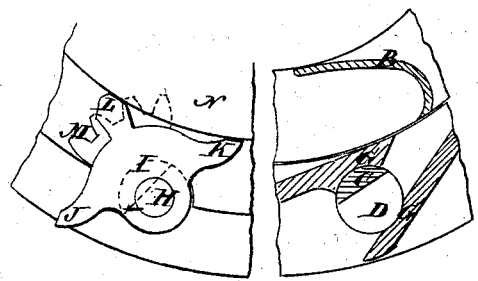

Figure 1 is a plan view of my improved wheel. Fig. 2 is a horizontal section taken on the line $x\,x$ of Fig. 3. Fig. 3 is a transverse sectional elevation taken on the line $y\,y$ of Fig. 1; and Fig. 4 is partly a plan view and partly a horizontal section of a portion of the wheel, showing one of the gates open and the position of the actuating devices therefor.

Similar letters of reference indicate corresponding parts.

A represents the chutes or passages for conducting the water to the buckets B of the wheel. C represents the gates, which are in the form of a section of a cylinder with cylindrical ends or journals D, which are fitted in bearings in the bottom flange E and the top flange F of the case of the wheel. The walls of the chutes are concaved, as shown at G, to correspond with the curvature of the gates to allow them to turn freely in opening and closing, and they are sufficiently close together for the chutes to be stopped by the gates when turned into the position represented in Fig. 2. At the upper end the gates have an extension, H, for the application of means for turning them. In these respects the gates are the same as they have been heretofore arranged; but, whereas they have all been connected to the apparatus for opening and closing them so that all were opened or closed together, I propose, for operating them separately and in succession, either singly or in two, as aforesaid, to provide each gate spindle or shaft with a head-piece, I, with arms J and K on opposite sides of the axes, a tooth, L, between said arms, and a toothed segment, M, of about four teeth, immediately below the tooth L, which is larger and longer than the teeth of the segment; and, in connection with this head I, I arrange a disk, N, on the shaft of the wheel or a hub, O, of the case, so as to turn freely with a plane face in the plane of the arms and tooth L, having, by preference, two notches, P, with a toothed segment, Q, to each notch diametrically opposite each other. The disk N has a toothed segment, R, which extends half way around it in case two opposite gates are to be actuated at once, but will extend all the way in case only one bucket is to be actuated at one time, with which a pinion, S, of the gate-actuating shaft gears for opening and closing the gates by a hand-wheel on the shaft T. The segments Q are to gear with the gates as they come to them, and open and close them successively, according to the way the disk is turned. The arms J and K are to come against the face of the disk and prevent the gates from being turned too far, and, in conjuction with the tooth L, which also bears against the face of the disk, to lock the gates against turning after being shifted either way and the toothed segment of the disk has passed beyond the gate. The notch P is to allow the tooth L to swing around when the segment on the disk encounters the one on the gate. When the arm K and the tooth L are in contact with the face of the disk the gate is open, and it is closed when the arm I and the tooth are against it.

In Figs. 1 and 2 all the gates except two are represented as closed; the two excepted are represented as partly closed, the disk being nearly to the end of its movement to the right.

By a full movement of the disk—that is, half a revolution to the left—all the gates will be opened. The tooth L is so adjusted that after the segment Q has escaped from the segment of the gate the corner of the disk at the notch will come against it and turn the gate a little further, and bring the arm J or K, as the case may be, fairly against the face of the disk.

Hitherto in wheels of this character the case has terminated at the flange E, or slightly below it, which has been fitted on the floor of the flume to support the wheel and make a water-tight joint with it around the hole, through which the water discharges below. This arrangement is objectionable, for although it is possible to fit the outer edge of the flange to the floor water-tight, it is so difficult to make the joint tight within the outer edge that the water leaking through the flange at the holes for the bearings D usually finds room to escape, and these holes soon wear larger by the sand which works in, so that the waste of water soon comes to be very considerable. Moreover, when the wheel is set so low down, whatever stones, pieces of iron, coal, or other heavy and hard bodies that may get into the flume are carried into the wheel and the chutes by the water and greatly injure it.

To overcome these defects I propose to extend the case below the flange E and provide a special flange, U, for resting on the floor to support the wheel and make the joint around the discharge-hole; also to support the wheel so high as to prevent heavy bodies from being carried into the wheel. This flange, not having the holes for the bearings of the gates, will not be subject to the difficulties attending the making of a tight joint with the flange E, and the water leaking through the flange E at the holes for the journals will remain in the flume.

Having thus described my invention, I claim as new and desire to secure by Letters Patent—

The combination of the disk N, having one or more notches, and toothed segments Q, as described, with the gates having arms J K, tooth L, and a toothed segment, M, substantially as specified.

JOHN C. GREEN.

Witnesses:
WILLIAM BARTLEY,
HENRY D. LARISON.